Oct. 20, 1970    W. R. WHITE    3,535,147

SUBBED FILM ELEMENT AND METHOD FOR PRODUCING SAME

Filed Jan. 4, 1968

WALTER R. WHITE
INVENTOR.

BY

ATTORNEYS & AGENT

United States Patent Office 3,535,147
Patented Oct. 20, 1970

3,535,147
SUBBED FILM ELEMENT AND METHOD
FOR PRODUCING SAME
Walter Raymond White, Rochester, N.Y., assignor to
Eastman Kodak Company, Rochester, N.Y., a corporation of New Jersey
Filed Jan. 4, 1968, Ser. No. 696,088
Int. Cl. B44d 1/14; G03c 1/84, 1/20
U.S. Cl. 117—83                    13 Claims

ABSTRACT OF THE DISCLOSURE

A direct aqueous sub assures adhesion of polymeric layers to a variety of polymer film supports for exceptionally long periods under extreme variations of environmental conditions. The invention relates to a two-component subbing system which comprises a first aqueous subbing solution containing a swelling agent for the polymer film being subbed and certain polyvalent metal salts and a second aqueous subbing solution containing a gelatin, a swelling agent for polymer film being subbed and certain polyvalent metal salts. According to the present processes, subbing of the polymer film support is achieved by applying a dilute aqueous solution of certain polyvalent metal salts plus a polymer film support swelling agent to the polymer film support; drying and curing the layer so formed; applying an aqueous gelatin solution containing certain polyvalent metal salts plus a film support swelling agent over the initial layer; and drying and curing this second layer. The above process yields a composite film element comprising a polymer film support and a two-layer subbing system comprising a first thin layer of certain polyvalent metal salts adhering tightly to the polymer film support and a second thin layer of a gelatin and certain polyvalent metal salts lying over said first layer and adhering thereto.

---

Figure 1:
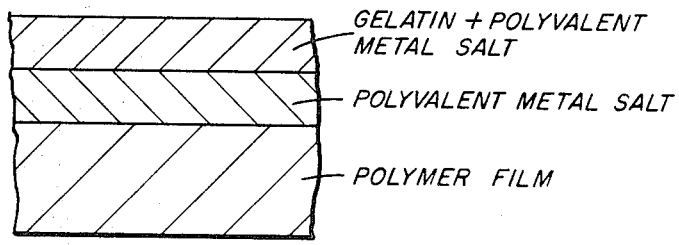

This invention relates to subbed polymer film supports, and more particularly to aqueous subbing systems which provide superior adhesion of emulsions to polymer film supports and to a method of producing same.

Emulsions or dispersions of the type utilized in photographic film and magnetic tape, among other applications, must remain adherent to their supports when subjected to a variety of stringent and varying storage conditions. Furthermore, the systems and processes utilized to achieve this maximal and resistant adhesion must be economical and provide relatively safe working and handling conditions.

Even more importantly, the emulsion to film support bond must be such that creeping (the tendency of the emulsion to slide on the film support as it shrinks and expands with heat and humidity, causing cracks to occur in the hardened emulsion) is prevented or at least minimized.

When non-aqueous subbing systems are utilized to achieve improved adhesion, manufacturing processes are severely limited due to the toxicity and handling problems which accompany their use, resulting in much higher processing costs. Furthermore, organic solvent systems often produce degrading effects upon the polymer film support or base or alternatively upon the emulsion applied over the subbing layer or layers. For this reason, those skilled in the subbing art have tended to seek improved aqueous rather than purely organic subbing systems.

The prior art includes several proposals for solving the subbing problem. The first of the two most popular of these proposals, described in U.S. Pat. 2,852,378, provides utilization of a sub comprising a terpolymer composed of methyl acrylate, vinylidene chloride and itaconic acid overcoated with a second subbing layer comprising a gelatin and chromic chloride, the latter component amounting to from 12 to 200% of the weight of the gelatin. Such a system provides excellent adherence of the emulsion to the polymer film support. However, the use of such a subbing system almost invariably causes the gelatin to harden excessively.

A second very well-known subbing system, an embodiment of which is disclosed in U.S. Pat. 2,698,235, utilizes a vinylidene chloride terpolymer layer overcoated with a gelatin layer which contains no chromic chloride, above that which may be used by those skilled in the art to harden the gelatin.

The use of a terpolymer layer in the sub does not eliminate the creeping and consequent emulsion cracking problems discussed above, and neither of these systems permits manufacture of a photographic film or magnetic tape which will withstand extremes of temperature and humidity for extended periods without some tendency for the emulsion to peel from its polymer film support.

It is, therefore, an object of the present invention to provide an improved aqueous subbing system.

Another object of the present invention is the provision of a subbing system which is stable, non-degrading, and which can eliminate the creeping and emulsion cracking problems.

Still another object of the present invention is the provision of a subbing system which provides superior emulsion to polymer film support adhesion, especially in cyclic storage and use.

Yet another object of the present invention is the provision of a composite film element which provides superior emulsion to polymer film support adhesion when an emulsion layer is cast thereon.

A still further object of the present invention is the provision of a process for the production of the composite film element of the above-described objects.

Figure 2:
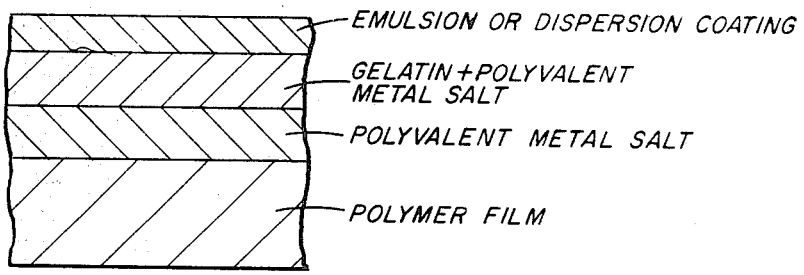

Other objects and advantages of the present invention will be made obvious to those skilled in the art by the following description when considered in relation to the accompanying drawing of which:

FIG. 1 is a cross-sectional view of a preferred embodiment of the composite film element of this invention; and FIG. 2 is a cross-sectional view of a film product comprising in part the composite film element of the present invention.

According to the present invention, there is provided a composite film element comprising (1) a polymer film support and (2) a two-layer sub comprising (a) a first thin layer of a very small amount of a polyvalent metal salt selected from the group consisting of ferric, stannous, stannic, chromic, and zirconium salts adhering tightly to the polymer film support, and (b) a second thin sub layer of a gelatin and a polyvalent metal salt selected from the group consisting of ferric, stannous, stannic, chromic, and zirconium salts which second sub layer lies over the first sub layer and adheres very tightly thereto. There is further provided a subbing system for use in the manufacture of the composite film element described above, which subbing system comprises two subbing solutions. The first solution consists of a polyvalent metal salt of the type described above and a polymer film swelling agent and the second solution consists of an aqueous solution of a gelatin, a polyvalent metal salt of the class described above, and a polymer film swelling agent.

There are also provided processes for applying the novel subbing compositions to a polymer film support to produce the composite film element described above, said processes in the preferred embodiment comprising the steps of:

(1) Applying a first coating comprising a dilute aqueous solution of a polyvalent metal salt selected from the group consisting of ferric, stannic, stannous, chromic, and zirconium salts plus a polymer film swelling agent to the polymer film support;

(2) Drying and curing this first coating to form a first subbing layer;

(3) Applying a second coating comprising an aqueous gelatin solution containing a polyvalent metal salt selected from the group consisting of ferric, stannous, stannic, chromic, and zirconium salts plus a polymer film swelling agent to the first subbing layer; and (4) Drying and curing this second coating to form a second subbing layer.

As shown in FIG. 1, the preferred composite film elements of the present invention consist of a polymer film having tightly adhering thereto a first sub layer comprising a very thin layer of a polyvalent metal salt selected from the group consisting of ferric, stannous, stannic, chromic, and zirconium salts and a second sub layer comprising a very thin layer of gelatin and a polyvalent metal salt of the class described above.

FIG. 2 shows a film product made up in part of the composite film element of the present invention. The film product has a polymer film base, the first and second subbing layers adhering thereto, and an emulsion or dispersion coating which adheres to the surface of the upper subbing layer. The emulsion or dispersion coating may consist of a light-sensitive emulsion of the type used in photographic film, a dispersion of the magnetic type as used in the manufacture of magnetic tapes or for that matter of any type wherein an emulsion or dispersion is coated upon a polymer film base or support. As demonstrated by the examples set out below, the application of such emulsions over the sub layers, discussed in detail hereinafter, yields finished products whose emulsion to polymer film support adhesion is substantially superior to that achieved utilizing conventional subbing layers and techniques.

The polymer film bases which have been found useful in the present composite film elements run the gamut of the polymer films presently in use in the arts which include the photographic film and magnetic tape arts. These include in particular the polyesters such as polyethylene terephthalate, and poly(1,4-cyclohexane dimethylene terephthalate); cellulose esters such as cellulose acetate, cellulose acetate butyrate and derivatives thereof; and also the polycarbonates. As later described, the particular polymer film utilized limits to some degree the composition of the subbing system applied. However, any of the above polymers or analogs thereof are suitable for use in the composite film of this invention.

The two subbing layers which ultimately adhere to the polymer film support are dependent for their composition upon the particular subbing solutions which are applied to the polymer film support and subsequently dried and cured thereon.

The polyvalent metal salts which have been found useful in the present solutions and composite film elements are generally those characterized by the polyvalent ferric, chromic, zirconium, stannous, and stannic ions. Salts of such ions provide suitable gelatin hardeners for the solutions of the present invention and, furthermore, provide the increased adhesion to the polymer film support which forms such an important aspect of the development of the present invention. The aluminum and ferrous ions whose salts are also generally characterized as polyvalent metal salts do not produce the desired effects of this invention and, hence, are neither useful nor operative in the present invention.

As exemplified by Example 2 set out below, some of the useful polyvalent metal salts may have organic ions capable of swelling the polymer film support added thereto, i.e., polyvalent inorganic ion salts may be complexed with organic ions to form, for example, in the case of chromium, what are commonly referred to as Werner-type chromium complexes of the kind described in Canadian Pat. 506,283 whose formation and activities are described in detail in an article entitled "Chromium Complexes" by F. B. Hauserman published in Advances in Chemistry Series, number 23 at pages 338 to 356, which chromium complexes also produce the bonding effect desired in the present invention. For example, the preferred embodiment of the invention set out in Example 2 utilizes a chromic chloride salt complexed with the $\beta$-resorcylato ion and containing a ratio of from 2/1 to 1/1 of chromium ion to $\beta$-resorcylato ion derived from resorcylic acid to achieve the desired result. Successful coatings have also been made utilizing polyvalent inorganic ions having trichloroaceto, salicylato and 3,5-benzoato groups attached thereto.

The swelling agent used in the subbing solutions depends primarily upon the nature of the polymer film support being subbed. For example, in the preferred embodiments set forth in the examples below, a polyethylene terephthalate support film was used and the swelling agent employed consisted of resorcinol. In the case where a cellulose triacetate film is used as support, acetone provides a suitable swelling agent and in the case of a polycarbonate support, propylene chloride serves to adequately soften or activate the surface of the film support. Swelling agents with large numbers of carboxyl groups as for example, salicylic acid, may complex with the useful polyvalent metal salt cations and thus hinder the ability of the polyvalent metal salt to bind itself to the polymer film support. Hence, the use of any such swelling compounds which provide a large number of carboxyl groups capable of complexing with polyvalent inorganic ions should, in all reasonable cases, be avoided or, if such compounds need be used, their concentrations maintained at a relatively low level.

Furthermore, in order to achieve the desired results, the subbing solutions of the present invention must be maintained at a pH of from about 3 to a maximum of 7, since below and above these respective pH levels the desired effect is not achieved for reasons which are not clear to the inventors at this time.

As will be clear from the discussion of the subbing process which is set out below, very little, if any, of this swelling agent is present in the final composite film, as it is generally evaporated during the drying and curing steps. Its sole purpose in the solution is to activate the surface of the polymer film support so that the useful polyvalent metal salt may more effectively attack the polymer film surface and hence retain a high degree of adhesion therebetween.

Although any gelatin that is useful in conventional photographic or radiographic processes can be used in the successful practice of this invention, generally the gelatin which is used in the second subbing solution varies somewhat, depending upon the application to which the product (comprising, in part, the composite film element of this invention) is to be put. For example, film for use in the photographic arts will preferably utilize the natural gelatins.

In certain applications, it is hopeful to add a small amount of a wetting agent such as a polyoxyethylene, long chain sulfonic acids or plant product wetting agents, to the subbing solutions in order to insure even and smooth distribution of the subbing solution over the surface of the polymer film support. When such wetting agents are not added, the subbing surface may deform during application and processing to yield a lacy-type layer of sub with some areas of the polymer film heavily coated while other portions thereof have no sub coating whatsoever. For this reason, the examples set out below include a wetting agent, Saponin, a natural plant product wetting agent, in a very small concentration. Other conventional wetting agents of which there are many known to those skiled in the art, can also be used, however.

It should be noted at this point that the above-described subbing solutions have a maximum effective shelf life of about 16 hours or more depending upon the solution components. In the case of the prefered chromic-resorcinol solution, utilized in Example 1 below, shelf life approaches 12 hours. Solutions stored for periods longer than the above-stated periods tend to lose their adhesion improving properties and eventually become significantly less effective for such purposes.

Generally, in the practice of the process aspect of this invention, the method for subbing polymer film supports according to this invention comprises the steps of:

(a) Applying a first coating comprising a dilute aqueous solution of useful polyvalent metal salt plus a swelling agent to the polymer film support;

(b) Drying and curing the first coating to form a first subbing layer;

(c) Applying a second coating comprising an aqueous gelatin solution containing useful polyvalent metal salt plus a swelling agent to the first subbing layer; and (d) Drying and curing the coating to form a second subbing layer.

Successful coatings have been made with one or both solution applied from a dip pan and then metered off with an air knife, however, any conventional sub-coating means may be utilized.

Complete curing of the initial application or layer is a necessary part of this invention. For example, if the initial layer is heated for only one (1) minute at 240° F., the wet adhesion is markedly weaker and the adhesion after processing is noticeably reduced compared with the same coatings cured for 5 minutes at 240° F. as set out in the examples below. Hence, the drying and curing of the first step should be carried out by heating to at least 200° F. for a period of at least 1 minute. The upper limit of this curing temperature range is set by the softening point of the polymer film support and the thermal stability of the inorganic gelatin hardener utilized.

The following examples illustrate my invention, it being understood that the examples are included for purposes of illustration and not to limit the scope of the invention unless otherwise specified.

EXAMPLE 1

Polyethylene terephthalate film is formed by extrusion, stretched laterally and longitudinally while amorphous to biaxially orient and crystallized by heat to a density of 1.390. The following solution is applied by roller coating:

| | Percent by weight of solution |
|---|---|
| Chromic chloride hexahydrate | 1.0 |
| Resorcinol | 0.8 |
| Saponin | 0.075 |
| Water | Balance to 100.0 |

Use measurements indicate that about 0.25 mg. of the chromium atom is applied per square decimeter of surface coated. This initial subbing layer is cured five (5) minutes at 240° F.

The following solution is then applied according to a similar roller coating method to a thickness of 1 mil:

| | Percent by weight of solution |
|---|---|
| Gelatin | 1.0 |
| Resorcinol | 4.0 |
| Saponin | 0.075 |
| Chromic chloride hexahydrate | 0.015 |
| Water | Balance to 100.0 |

Use measurements indicate a density of chromium applied of 0.04 mg. per square decimeter of surface coated.

The coating is dried and cured for one (1) minute at 240° F. A thin hardened emulsion suitable for graphic arts uses is coated thereon. The emulsion cannot be separated from the support by the most rigorous tests known in the testing art. This applies whether the raw, wet or dried processed emulsion is tested. Further, if the emulsion is cyclically wet and dried every hour for 60 hours, no visible loosening of the emulsion bond is noted. Most polyethylene terephthalate film sold is subbed as described in Example 13 of U.S. Pat. 2,698,235 using a terpolymer layer of methyl acrylate, vinylidene chloride and itaconic acid. About half of the emulsion peels off such film when cycled as above.

EXAMPLE 2

Polyethylene terephthalate, as described in Example 1, is roller coated with a 0.5 mil thickness of the following solution:

| | Percent by weight of solution |
|---|---|
| β-Resorcylato chromic chloride (6% chromium in isopropyl alcohol) 1:1 chromic to β-resorcylato ion | 0.35 |
| Resorcinol | 0.8 |
| Saponin | 0.075 |
| Water | Balance to 100.0 |

After drying and curing for five (5) minutes at 240° F., the following is applied in a 1.0 mil thickness over the first layer:

| | Percent by weight of solution |
|---|---|
| Saponin | 0.075 |
| Gelatin | 0.2 |
| β-Resorcylato chromic chloride (6% chromium in isopropyl alcohol) 1:1 chromic to β-resorcylato ion | 0.01 |
| Resorcinol | 2.0 |
| Water | Balance to 100.0 |

This layer is then cured at 240° F. for one (1) minute. When the support subbed in this manner is coated with a black and white emulsion of the type used for releasing motion pictures, the emulsion before and after processing cannot be removed with pressure sensitive tape even after it has been scored through. During processing, no portion of the emulsion can be separated from the support even when the surface is scored and vigorously rubbed with considerable pressure.

As should be clear from the examples, the two solutions of the subbing composition are dilute aqueous solutions, i.e. the solutes constitute, in any case, at most about 8% by weight of the entire subbing solution.

Other polyvalent metal salts and other polymer film base swelling agents as described hereinabove may be utilized in the successful practice of the above example by substituting equivalent amounts thereof for the particular materials used therein.

According to the preferred embodiments of the present invention the level of useful polyvalent metal salt ranges from about 0.25% to about 1.5%, the swelling agent is present in concentration from 0.5% to 1.5%, and the wetting agent ranges in concentration from 0.05% to 0.2% in the initial subbing solution. In the second subbing solution, the level of the useful polyvalent metal salt ranges from about 0.005% to 0.03% the wetting agent ranges in concentration from 0.05% to 0.2%, the gelatin content ranges from 0.1% to 2.5% and the swelling agent is present in concentrations of from 1% to 5%. In any given second subbing layer, the polyvalent metal salt should not comprise more than from about 0.1% to about 5% by weight of gelatin present in the second sub layer to achieve optimum results.

It should, of course, be understood that the aqueous solution of this invention may contain other materials such as solvents, for example, alcohols such as methanol and ethanol, in small quantities without detracting from the benefits that can be attained by practicing the invention or utilizing the products thereof.

Furthermore, the polymer film base may contain fillers such as carbon, dyes, plasticizers such as triphenyl phosphate and extenders so long as the same do not detract from the qualities of the subbed film base produced in accordance with the present invention.

As the examples also show, the first subbing layer of the useful polyvalent metal salt, in the preferred embodiment a chromic chloride salt or the β-resorcylic acid complex of that salt, is considerably thinner than the heavy chromic chloride subbing layer of the prior art, applied using an amount of chromic chloride from 12–200% of the weight of the gelatin in the sub. It is this thin layer of strongly adhering salt which effectively serves to reduce creeping of the overlying emulsion layers and their consequent cracking, there being little or no capability for movement in the thin and tightly adhering subbing layer of the present invention. Measurements upon samples of the film composition of this invention produced according to the process and with the subbing solutions of this invention have demonstrated a polyvalent metal atom density on the surface of the polymer film after the initial subbing of from 0.1 to 1 mg. of the polyvalent metal atom per square decimeter of polymer film. Measurements upon film produced in accordance with Example 1, as stated above, demonstrated a chromium density of 0.25 mg. per square decimeter of polymer film. The amount of polyvalent metal remaining after drying and curing of the second subbing solution in generally about that contained in conventional gel subs and can range from about 0.01 to about 0.1 mg. of the polyvalent metal can per square decimeter of polymer film base. As stated in Example 1, the products of that example demonstrated a chromium atom density of 0.04 mg. per square decimeter of base in the second subbing layer. Thus, the composite two-layer subbing system provides a combined polyvalent metal atom density on the surface of the polymer film base which ranges from about 0.11 to about 1.1 mg. of polyvalent metal atom per square decimeter.

It is not certain what chemical state the polyvalent metal which forms the residue of the solution possesses, i.e., whether it is present in a "salt," a "complex" or an "atomic" form, although it is presumed that it is present as a complexed salt and that, hence, the measurements of polyvalent metal density represent measurements of polyvalent metal atom.

As a further indication that the character of the sub applied herein differs substantially from that applied according to U.S. Pat. 2,852,378 wherein there is incorporated into a gelatin sub an amount of chromic chloride amounting to from 12 to 200% of the weight of the gelatin in the sub, it should be noted that when washed with water, subbed films prepared according to the above patent lose substantially all of their chromic chloride coating while film compositions prepared according to the present method, when washed with water, retain substantially all of the sub-coating adhering to their surface. This property becomes of critical importance when it is recalled that a majority of the emulsions applied to subbed films consist of aqueous solutions, the aqueous portion of which will not strip subbing layers applied according to the present invention from the polymer film support while it may strip those applied using prior art methods.

Since it is obvious that many changes and modifications can be made in the above-described details without departing from the nature and spirit of the invention, it is to be understood that the invention is not limited to said details.

I claim:
1. A composite polymer film element comprising:
 (a) a polymer film support selected from the group consisting of polyester, cellulose ester, and polycarbonate films; and
 (b) a two-layer sub coated on the surface of said polymer film support, said two-layer sub comprising a first subbing layer in contact with said polymer film support and a second subbing layer over said first subbing layer, said first subbing layer consisting essentially of the dried and cured residue of an aqueous solution of a polyvalent metal salt selected from the group consisting of stannous, stannic, ferric, chromic, and zirconium salts and a swelling agent for said polymer film support and said second subbing layer consisting essentially of the dried and cured residue of an aqueous gelatin solution of a polyvalent metal salt selected from the group consisting of stannous, stannic, ferric, chromic, and zirconium salts and a swelling agent for said polymer film support, said first layer containing from about 0.1 to about 1.0 mg. of polyvalent metal ion per square decimeter of film surface, and the total amount of polyvalent metal ions in said two-layer sub being from about 0.11 to about 1.1 mg. per square decimeter of film surface.

2. The composite polymer film element of claim 1 wherein said polymer film support consists essentially of a polymer selected from the group consisting of cellulose acetate, cellulose acetate butyrate, and polyethylene terephthalate.

3. The composite film element of claim 1 wherein the anionic portion of said polyvalent metal salt consists of the chloride ion.

4. The composite film element of claim 3 wherein said polyvalent metal salt consists of a hybrid salt comprising said polyvalent metal chloride complexed with an anion selected from the group consisting of the trichloroaceto, salicylato, 3–5 dihydroxybenzoato and β-resorcylato anions.

5. The composite film element of claim 3 wherein said second subbing layer comprises said gelatin and from about 0.1% to about 5% of said polyvalent metal salt based upon the weight of said gelatin in said second sub layer.

6. A process for subbing polymer film selected from the group consisting of polyester, cellulose ester and polycarbonate films comprising the steps of:
 (a) applying a first coating comprising a dilute aqueous solution of a polyvalent metal salt selected from the group consisting of ferric, stannous, stannic, chromium, and zirconium salts plus a swelling agent to a polymer film, said dilute aqueous solution having a pH of from about 3 to 7;
 (b) drying and curing said first coating to form a first sub layer;
 (c) applying a second coating comprising an aqueous gelatin solution containing a polyvalent metal salt selected from the group consisting of ferric, stannic, chromium, and zirconium salts plus a swelling agent to said first sub layer, said aqueous gelatin solution having a pH of from about 3 to 7; and
 (d) drying and curing said aqueous gelatin solution to form a second sub layer.

7. A process for subbing polymer film in accordance with claim 6 wherein said drying and curing of both said dilute aqueous solution and said aqueous gelatin solution is accomplished by heating to at least 200° F. for a period of at least one (1) minute.

8. A process for subbing polymer film in accordance with claim 7 wherein said swelling agent is selected from the group consisting of resorcinol, acetone, trichloroacetic acid, chloral hydrate, phenol and propylene chloride.

9. A process for subbing polymer film in accordance with claim 6 wherein the anionic portion of said polyvalent metal salt consists of the chloride ion.

10. A process for subbing polymer film in accordance with claim 6 wherein said polyvalent metal salt consists of a hybrid salt comprising said polyvalent metal chloride complexed with an anion selected from the group consisting of the trichloroaceto, salicylato, 3-5-dihydroxybenzoato and β-resorcylato anions.

11. A process for subbing polymer film in accordance with claim 6 wherein said dilute aqueous solution and said aqueous gelatin solution include a wetting agent, said dilute aqueous solution comprises from about 0.25 to about 1.5% by weight of said swelling agent, and from about 0.005 to about 0.2% by weight of said wetting agent, and said aqueous gelatin solution comprises from about 0.1 to about 2.5% by weight of said gelatin, from about 0.005 to about 0.03% by weight of said polyvalent metal salt, from about 1 to about 5% by weight of said swelling agent and from about 0.05 to about 0.2% by weight of said wetting agent.

12. A process for subbing polymer film in accordance with claim 11 wherein said dilute aqueous solution consists of:

| | Percent by weight of solution |
|---|---|
| Chromic chloride hexahydrate | 1.0 |
| Resorcinol | 0.8 |
| Saponin | 0.075 |
| Water | Balance to 100.0 | and said aqueous gelatin solution consists of:

| | Percent by weight of solution |
|---|---|
| Gelatin | 1.0 |
| Resorcinol | 4.0 |
| Saponin | 0.075 |
| Chromic chloride hexahydrate | 0.015 |
| Water | Balance to 100.0 |

13. A process for subbing polymer film in accordance with claim 12 wherein said dilute aqueous solution consists of:

| | Percent by weight of solution |
|---|---|
| β-Resorcylato chromic chloride (6% chromium in isopropyl alcohol) (1:1 chromic to β-resorcylato ion) | 0.35 |
| Resorcinol | 0.8 |
| Saponin | 0.075 |
| Water | Balance to 100.0 | and said aqueous gelatin solution consists of:

| | Percent by weight of solution |
|---|---|
| Saponin | 0.075 |
| Gelatin | 0.2 |
| β-Resorcylato chromic chloride (6% chromium in isopropyl alcohol) (1:1 chromic to β-resorcylato ion) | 0.01 |
| Resorcinol | 2.0 |
| Water | Balance to 100.0 |

References Cited

UNITED STATES PATENTS

| 2,835,609 | 5/1958 | Stark et al. | 117—34 X |
| 2,875,056 | 2/1959 | Smith et al. | 117—83 X |
| 2,942,975 | 6/1960 | Eerde | 96—111 X |
| 3,022,192 | 2/1962 | Brandt. | |

WILLIAM D. MARTIN, Primary Examiner

R. HUSACK, Assistant Examiner

U.S. Cl. X.R.

96—84, 111; 106—135; 117—7, 34, 138.8, 145, 239; 252—182